(12) United States Patent
Mortimer

(10) Patent No.: US 9,181,407 B2
(45) Date of Patent: Nov. 10, 2015

(54) COMPOSITE MATERIALS

(75) Inventor: Steve Mortimer, St. Ives (GB)

(73) Assignee: Hexcel Composites Limited, Cambridge (GB)

( * ) Notice: Subject to any disclaimer, the term of this patent is extended or adjusted under 35 U.S.C. 154(b) by 210 days.

(21) Appl. No.: 13/703,047

(22) PCT Filed: Jun. 14, 2011

(86) PCT No.: PCT/GB2011/051106
§ 371 (c)(1),
(2), (4) Date: Dec. 10, 2012

(87) PCT Pub. No.: WO2011/158020
PCT Pub. Date: Dec. 22, 2011

(65) Prior Publication Data
US 2013/0090414 A1  Apr. 11, 2013

(30) Foreign Application Priority Data
Jun. 14, 2010  (GB) .................................. 1009851.5

(51) Int. Cl.
*C08J 3/24* (2006.01)
*C08J 5/24* (2006.01)

(52) U.S. Cl.
CPC ..... *C08J 3/24* (2013.01); *C08J 5/24* (2013.01)

(58) Field of Classification Search
CPC ....................................... C08J 3/24; C08J 5/24
See application file for complete search history.

(56) References Cited

U.S. PATENT DOCUMENTS

| | | | | |
|---|---|---|---|---|
| 3,395,105 A * | 7/1968 | Washburn et al. | ............ | 523/211 |
| 5,017,522 A * | 5/1991 | Hegedus | ........................ | 501/81 |
| 5,206,332 A * | 4/1993 | Hammer et al. | ............... | 528/118 |
| 5,371,152 A * | 12/1994 | Hoyano et al. | ................. | 525/423 |
| 6,323,263 B1 * | 11/2001 | Kuwabawa et al. | ........... | 523/443 |
| 6,391,436 B1 * | 5/2002 | Xu et al. | ..................... | 428/298.1 |
| 7,041,740 B2 * | 5/2006 | Martin | .......................... | 525/191 |
| 7,223,466 B2 * | 5/2007 | O'Byrne | ..................... | 428/297.4 |
| 7,754,322 B2 * | 7/2010 | Tilbrook et al. | ........... | 428/297.4 |
| 2005/0070666 A1 | 3/2005 | Martin | | |
| 2006/0188726 A1 * | 8/2006 | Muenz et al. | ................. | 428/413 |

(Continued)

FOREIGN PATENT DOCUMENTS

| | | |
|---|---|---|
| EP | 1553125 A1 | 7/2005 |
| JP | 58107312 | 6/1983 |

(Continued)

OTHER PUBLICATIONS

Machine Translation—JP2005-105151, Apr. 21, 2005.

(Continued)

*Primary Examiner* — Michael Pepitone
*Assistant Examiner* — Michael A Salvitti
(74) *Attorney, Agent, or Firm* — W. Mark Bielawski; David J. Oldenkamp

(57) ABSTRACT

A process for the manufacture of a cured composite material, the process comprising the steps of blending together a liquid curable resin and a curing agent having a melting point greater than 100° C. to form a liquid blend of curable resin and curing agent, at least partially impregnating a structural fiber arrangement with the blended curable resin and curing agent to form a curable composite material, followed by curing the composite material by exposure to elevated temperature and at a pressure of no greater than 3 bar absolute to form a cured composite material.

20 Claims, 3 Drawing Sheets

(56) References Cited

U.S. PATENT DOCUMENTS

| | | | |
|---|---|---|---|
| 2008/0255315 A1* | 10/2008 | Ogura et al. | 525/403 |
| 2010/0104763 A1* | 4/2010 | Harrington et al. | 427/385.5 |
| 2010/0136278 A1* | 6/2010 | Cadd et al. | 428/60 |
| 2010/0219612 A1* | 9/2010 | O'Byrne et al. | 280/601 |
| 2011/0017867 A1* | 1/2011 | Simmons et al. | 244/1 A |
| 2011/0049426 A1* | 3/2011 | Patel et al. | 252/299.01 |
| 2011/0070447 A1* | 3/2011 | Harrington et al. | 428/411.1 |
| 2011/0152469 A1* | 6/2011 | Cross et al. | 525/523 |
| 2011/0220401 A1* | 9/2011 | Ying et al. | 174/260 |
| 2012/0088863 A1* | 4/2012 | Wang | 523/435 |
| 2013/0090414 A1* | 4/2013 | Mortimer | 523/468 |
| 2014/0217332 A1* | 8/2014 | Simmons et al. | 252/511 |

FOREIGN PATENT DOCUMENTS

| | | |
|---|---|---|
| JP | 0741575 | 2/1995 |
| JP | 2002-069203 A1 | 3/2002 |
| JP | 2005105151 | 4/2005 |
| WO | 02/16481 A1 | 2/2002 |
| WO | 2008130484 | 10/2008 |

OTHER PUBLICATIONS

Machine Translation—JP0741575, Feb. 10, 1995.

* cited by examiner

Void content = 3.24%

Void content = 0.17%

COMPOSITE MATERIALS

TECHNICAL FIELD

The present invention relates to improvements in manufacture of composite materials, particularly, but not exclusively for application in aerospace structures.

BACKGROUND

Composite materials have well-documented advantages over traditional construction materials, particularly in providing excellent mechanical properties at very low material densities. As a result, the use of such materials is becoming increasingly widespread and their fields of application range from "industrial" and "sports and leisure" to high performance aerospace components.

Prepregs, comprising a fibre arrangement impregnated with resin such as epoxy resin, are widely used in the generation of such composite materials. Typically a number of plies of such prepregs are "laid-up" as desired and the resulting laminate is cured, typically by exposure to elevated temperatures, to produce a cured composite laminate.

Such cured composite materials inevitably contain some degree of entrapped gas, or porosity, which can detract from the mechanical strength of the material. For example, gas bubbles can be present from the resin manufacturing step and the impregnation of fibres may be incomplete, both resulting in porosity being present.

To allow curing to occur, a curing agent is included in the resin which reacts with functional groups on the resin to form cross-links and provide the curing function. Such curing agents are typically blended with the curable resin at low temperatures to prevent thermal hazards and so that premature reaction between the resin and curing agent does not occur. The choice of curing agent strongly governs the mechanical properties of the cured resin.

For aerospace applications composite materials must meet extremely exacting requirements on porosity and mechanical strength. For this reason the curing of aerospace composites is almost exclusively carried out in an autoclave cure. Such curing is carried out at high pressure and temperature and tends to produce very low porosities and hence good mechanical properties. It is believed that the high pressure forces any entrapped gasses into solution, such that the composite material remains essentially void-free during cure.

However, autoclave cure is expensive and time-consuming to operate. Therefore methods of curing aerospace quality composite materials out-of-autoclave have been explored.

The present invention aims to mitigate or at least obviate the above defined problems and/or to provide improvements generally.

SUMMARY OF THE INVENTION

According to the invention, there is provided a process, a material and a use as defined in any one of the accompanying claims.

The invention relates to a process for the manufacture of a cured composite material, the process comprising the steps of blending together a liquid curable resin and a curing agent having a melting point greater than 100° C. to form a liquid blend of curable resin and curing agent, at least partially impregnating a structural fibre arrangement with the blended curable resin and curing agent to form a curable composite material, followed by curing the composite material by exposure to elevated temperature and at a pressure of no greater than 3.0 bar absolute to form a cured composite material.

When curing agents known to provide good mechanical properties in the cured material are employed, unacceptable porosity is found to result. However, the inventors have found that composite materials having aerospace quality mechanical properties and porosity can be prepared without the use of autoclave cure. This is achieved by selecting a curing agent with a high melting point known to give good mechanical performance and blending it with the resin at a temperature at which curable resin is liquid and the curing agent dissolves into the liquid resin to form a homogeneous liquid blend.

In a preferred embodiment, the curing agent has a melting point in the range of 70 to 220° C., preferably 70 to 220° C., more preferably 90 to 200° C., even more preferably 100 to 180° C. and most preferably 120 to 180° C.; or combinations of the aforesaid ranges. The melting point is determined by DSC (Differential Scanning calorimetry) in accordance with ASTM D3418.

In a preferred embodiment, the particle size of the solid curing agent is small, typically in the range of from 0.01 microns to 5 mm, more preferably from 0.1 microns to 1 mm, more preferably from 0.5 microns to 0.5 mm, even more preferably from 1 microns to 0.1 mm, and most preferably from 10 microns to 0.1 mm and/or combinations of the aforesaid ranges. The particle size is derived from the particle size distribution as determined by ASTM D1921-06e1 Standard Test Methods for Particle Size (Sieve Analysis) of Plastic Materials (Method A). Smaller particles have the advantage of dissolving quicker thereby reducing the residence time in the blender and increasing the flow of resin through the blender. This in turn reduces the risk of an uncontrolled release of exotherm energy of the blend and reduced activity of the resin following blending. If the blender is an extruder, this results in a shorter extruder which reduces the cost of the processing equipment.

Following high temperature blending which results in the dissolution of the curing agent in the resin and subsequent cooling of the blend, the blend forms a reinforcement resin which is suitable in combination with a fibre arrangement to provide a moulding material.

The curing agent may be selected from a wide variety of suitable materials known in the art, provided it has a melting point of greater than 100° C. Greater mechanical performance can be achieved if higher melting point curing agents are selected, thus a melting point greater than 120° C. is preferred, more preferably the melting point is greater than 140° C.

Suitable curing agents, by way of example are the diaminodiphenyl sulphones e.g. 3,3' DDS and 4,4'DDS, bis-aminophenyl fluorenes e.g. 9,9-bis(4-aminophenyl) fluorene, 9,9-bis(3-chloro-4-aminophenyl)fluorene, 3,4'-Oxydianiline, 4,4'-diaminobenzoylanilide, 1,3'-Bis(4-aminophenoxyl)benzene, 1,4-Bis(4-aminophenoxy)benzene, 4-Aminophenyl 4-aminobenzoate, Bis(4-aminophenyl) terephthalate, 2,2-Bis[4-(4-aminophenoxy)phenyl]propane, 2,2-Bis[4-(-aminophenoxy)phenyl]hexafluoropropane, 2,5-Bis(4-aminophenoxy)biphenyl, 4-4'-Bis(4-aminophenoxy) biphenyl, 4,4'-Bis(3-aminophenoxy)benzophenone, Bis(3-amino-4-hydroxyphenyl)sulfone, 4,4' diaminodiphenylether, bis(4-(4-aminophenoxy)phenylsulphone, Most preferred curing agents are the diaminodiphenyl sulphones, e.g. 3-3' DDS (melting point 172° C.) and 4-4' DDS (melting point 176° C.).

The curable resin may be selected from epoxy or isocyanate, for example. Preferably the curable resin is an epoxy resin.

Suitable epoxy resins may comprise monofunctional, difunctional, trifunctional and/or tetrafunctional epoxy resins.

Suitable difunctional epoxy resins, by way of example, include those based on; diglycidyl ether of bisphenol F, diglycidyl ether of bisphenol A (optionally brominated), phenol and cresol epoxy novolacs, glycidyl ethers of phenol-aldehyde adducts, glycidyl ethers of aliphatic diols, diethylene glycol diglycidyl ether, aromatic epoxy resins, aliphatic polyglycidyl ethers, epoxidised olefins, brominated resins, aromatic glycidyl amines, heterocyclic glycidyl imidines and amides, fluorinated epoxy resins, glycidyl esters or any combination thereof. Difunctional epoxy resins may be preferably selected from diglycidyl ether of bisphenol F, diglycidyl ether of bisphenol A, diglycidyl dihydroxy naphthalene, or any combination thereof.

Suitable trifunctional epoxy resins, by way of example, may include those based upon phenol and cresol epoxy novolacs, glycidyl ethers of phenol-aldehyde adducts, aromatic epoxy resins, aliphatic triglycidyl ethers, dialiphatic triglycidyl ethers, aliphatic polyglycidyl ethers, epoxidised olefins, brominated resins, triglycidyl aminophenyls, aromatic glycidyl amines, heterocyclic glycidyl imidines and amides, glycidyl ethers, fluorinated epoxy resins, or any combination thereof.

Suitable tetrafunctional epoxy resins include N,N,N',N'-tetraglycidyl-m-xylenediamine (available commercially from Mitsubishi Gas Chemical Company under the name Tetrad-X, and as Erisys GA-240 from CVC Chemicals), and N,N,N',N'-tetraglycidylmethylenedianiline (e.g. MY721 from Huntsman Advanced Materials).

In order that the curing agent and curable resin can be blended together to form a homogeneous liquid, the blending temperature must be high enough to allow the dissolution of the curing agent into the liquid resin, which may be below the melting point of the curing agent. However, if the blending temperature is too high then premature reaction between the curing agent and curable resin will begin.

The blending temperature may range from a temperature at which the curing agent dissolves into the curable resin up to a temperature below the melting point of the curing agent. Thus, typically the blending temperature is from 60 to 180° C., preferably from 80 to 160° C., more preferably from 90 to 150° C. Most preferably the curing agent is blended with the resin to dissolve the curing agent at temperatures ranging from 70 to 150° C., 90 to 140° C. and preferably 100 to 130° C.

Blending the curable resin and curing agent together at an elevated temperature increases the tendency for them to react prematurely together potentially leading to a thermal safety hazard or runaway exotherm reaction. Also, as the elevated blending temperature increases the activation level of the resin which enables the resin proceed to cure as the interpolymer network is formed, blending effectively reduces the activity of the resin. Thus, it is preferable if the blending operation at high temperature is carried out for as short a time as possible whilst ensuring good blending takes place.

In a preferred embodiment, blending is conducted in an in line or continuous process. Preferably, only a portion of the liquid resin is blended with the curing agent at any one time to control the temperature of the blend and to prevent the blend from curing prematurely. The residence time during blending is selected such that the solid curing agent is dissolved in the curable resin. The residence time in the blender may range from 1 s to 10 minutes, preferably from 30 s to 5 minutes, more preferably from 30 s to 2 minutes. The residence time is defined by the flow of the liquid resin through the blender and the dimensions of the blender, i.e. residence time=volume of blender/flow rate through blender.

Following blending, the blend may be cooled. Cooling may be conducted by increasing the surface area of the reinforcement resin to enable fast heat transfer. The resin may be exposed to a cooling medium such as air or a cooler or chiller. The blend may be cooled by casting of the blend or by impregnation of a structural fibre arrangement.

In a further embodiment, the liquid curable resin comprises a toughener or toughening agent. Preferably, the toughener or toughening agent is a thermoplastic. The thermoplastic toughening agent may be any of the typical thermoplastic materials that are used to toughen thermosetting aerospace resins. The toughening agents may be polymers, which can be in the form of homopolymers, copolymers, block copolymers, graft copolymers, or terpolymers. The thermoplastic toughening agents may be thermoplastic resins having single or multiple bonds selected from carbon-carbon bonds, carbon-oxygen bonds, carbon-nitrogen bonds, silicon-oxygen bonds, and carbon-sulphur bonds. One or more repeat units may be present in the polymer which incorporate the following moieties into either the main polymer backbone or to side chains pendant to the main polymer backbone: amide moieties, imide moieties, ester moieties, ether moieties, carbonate moieties, urethane moieties, thioether moieties, sulphone moieties and carbonyl moieties. The polymers may be either linear or branched in structure. The particles of thermoplastic polymer may be either crystalline or amorphous or partially crystalline.

Suitable examples of thermoplastic materials that are used as a toughening agent include polyamides, polycarbonates, polyacetal, polyphenylene oxide, polyphenylene sulphide, polyarylates, polyethers, polyesters, polyimides, polyamidoimides, polyether imides, polysulphones, polyurethanes, polyether sulphones, polyether ethersulfones and polyether ketones. Polyether sulfones and polyether ethersulfone are the preferred type of thermoplastic material. The amount of toughening agent present in the uncured resin composition will typically range from 5 to 30 wt %. Preferably, the amount of toughening agent will range from 10 wt % to 20 wt %.

Examples of commercially available thermoplastic toughening agents include Sumikaexcel 5003P PES, which is available from Sumitomo Chemicals Co. (Osaka, Japan), Ultrason E2020P SR, which is available from BASF (Ludwigshafen, Germany) and Solvay Radel A, which is a copolymer of ethersulfone and etherethersulfone monomer units that is available from Solvay Engineered Polymers, Auburn Hills, USA. Optionally, these PES or PES-PEES copolymers may be used in a densified form. The densification process is described in U.S. Pat. No. 4,945,154.

Therefore, preferably the blended curing agent and curable resin, prior to fibre impregnation, is greater than 100° C., preferably greater than 120° C., more preferably greater than 140° C., for less than 10 minutes, preferably less than 2 minutes, more preferably less than 1 minute.

Preferably the temperature of the blended curing agent and curable resin, prior to fibre impregnation, is greater than 100° C., preferably greater than 120° C., more preferably greater than 140° C., for less than 10 minutes, preferably less than 2 minutes, more preferably less than 1 minute.

It has also been found that applying a vacuum during resin blending can further reduce the eventual porosity.

The inventors have found that raising the temperature of a large quantity of resin for a short duration presents its own difficulties. Heat is typically transferred by heating the container within which the curable resin is contained which generates temperature gradients within the container.

It has been found that a convenient heating process involves passing the curable resin and curing agent through a narrow bore conduit, so that the heat has less distance over which to travel before the blending temperature is reached. This means that the material near the walls, which heats first, is not at the blending temperature for too long while the material at the centre begins to heat up.

Thus, preferably the process involves passing the liquid curing agent and liquid curable resin through a conduit having a characteristic diameter of less than 20.0 cm, preferably less than 10.0 cm, more preferably less than 5.0 cm. The characteristic diameter is taken to be the inside diameter of a notional conduit having a circular cross-section having the same surface area as that of the cross-section of the conduit.

Thus, heating the walls of the conduit to a temperature of from 100 to 300° C. provides good results.

In one preferred embodiment, the conduit comprises mixing elements. The mixing elements may be static or dynamic. In one particularly preferred process, a screw extruder is employed to provide the conduit and the mixing elements.

Once the blending operation takes place then it is important to cool the blended curable resin to minimise any undesirable premature reaction and thermal hazard.

Once prepared, the blended curable resin is then impregnated into a structural fibre arrangement in a manner known in the art. The degree of impregnation may vary, but for aerospace applications it is generally intended to substantially completely impregnate the fibres. In this embodiment substantially all of the fibres are in contact with curable resin.

Typically the structural fibres are planar, so that they form a prepreg once impregnated. The structural fibres may be in the form of random, knitted, non-woven, multiaxial or any other suitable pattern. However, preferably they are substantially unidirectional.

The structural fibres may comprise cracked (i.e. stretch-broken), selectively discontinuous or continuous fibres.

The structural fibres may be made from a wide variety of materials, such as carbon, graphite, glass, metallised polymers aramid and mixtures thereof. Carbon fibres are preferred.

The curable composite material may be formed into the shape of a wide variety of structures, however preferably it is formed into an aerospace structural component.

Once formed, the curable composite material is cured by exposure to elevated temperature. However, the pressure during cure does not exceed 3.0 bar absolute.

The curing process may be carried out at a pressure of less than 2.0 bar absolute. In a particularly preferred embodiment the pressure is less than atmospheric pressure. The curing process may be carried out at one or more temperatures in the range of from 80 to 200° C., for a time sufficient to cause curing to the desired degree.

Curing at a pressure close to atmospheric pressure can be achieved by the so-called vacuum bag technique. This involves placing the composite material in an air-tight bag and pulling a vacuum on the inside of the bag. This has the effect that the composite material experiences a consolidation pressure of up to atmospheric pressure, depending on the degree of vacuum applied.

Once cured, the composite material can be suitable for use in a structural application, for example an aerospace structure.

Such cured composite materials have a low porosity of less than 3.0% by volume porosity, preferably less than 2.0%, more preferably less than 1.0%, or even less than 0.5%.

In a further embodiment, there is provided the use of a reinforcement resin in a fibre arrangement, the resin being prepared by inline or continuous blending of a liquid curable resin with a curing agent at a temperature of 70° C. to 150° C., preferably 90° C. to 140° C., or 90° C. to 150° C., most preferably 100° C. to 140° C. (or combinations of the aforesaid ranges) to form a curable composite material having a porosity of less than 4.0% by volume porosity, preferably less than 3.0%, and more preferably less than 2.0% following out of autoclave curing. The porosity may range from 0% through to 5.0%, 0% through to 4%, to 3%, to 2% or to 1% or from 0.5% to 4%, to 3%, to 2% or to 1% and/or any combinations of the aforesaid porosities.

Out of autoclave curing may be conducted at temperatures ranging from 60° C. to 200° C., from 80° C. to 180° C., preferably from 80° C. to 160° C., most preferably from 80° C. to 140° C. and/or combinations of the aforesaid temperatures and/or at pressures below atmospheric pressure.

By "out of autoclave" curing, we refer to any technique which allows the composite material to be cured at an increased pressure without the use of an autoclave. Autoclaves generally comprise an evacuation chamber formed by a metal sealable housing in which the composite material or moulding is placed. The chamber is evacuated to a very low vacuum pressure whilst the moulding cures. As discussed, autoclaves are very expensive and also limit the size of the moulding which may be processed due to the dimensions of the evacuation chamber. The material of the present invention is particularly suited to vacuum bag processing which does not have the aforesaid disadvantages of an autoclave.

The invention will now be illustrated, with reference to the following drawings, in the following examples:

EXAMPLES

Comparative Example 1

Preparation of Resin by Conventional Mixing

To a Winkworth Z-blade mixer were added 1405 g MY721 (Huntsman) and 1405 g MY0510 (Huntsman) and 845 g 5003P Polyethersulphone powder (from Sumitomo). The temperature was raised to 130° C. and mixed for 2 hours until the polyethersulphone was dissolved into the resin. The resin mixture was then cooled to 80° C. before adding 1210 g 3,3' DDS and 135 g 4,4' DDS and mixed for 20 mins to disperse the DDS powder. The finished resin was then used to make, fully impregnated unidirectional prepreg tape of 145 g areal weight according to standard film transfer techniques. The fibre used was Hextow IM7-12K and the resin content was 35%.

Example 1

Preparation of Resin by Extruder Mixing

The same resin as above was made by introducing the DDS powders to the resin in a twin screw extruder of internal diameter 25 mm, with a barrel temperature of 110° C. and an applied vacuum of −0.8 bar gauge. In this case the DDS powders are dissolved into the resin.

Example 2

Preparation of Laminates

Figure 3:
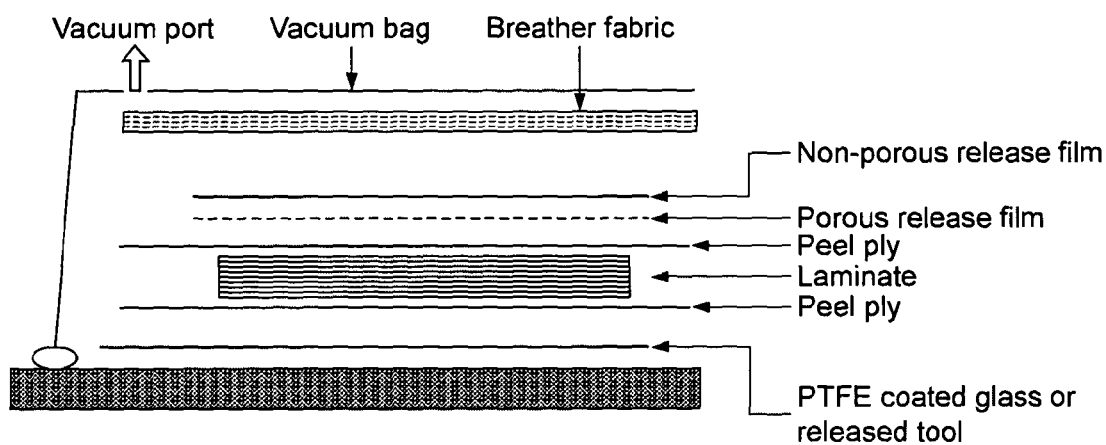
FIG. 3 is a schematic representation of the vacuum bag curing arrangement used in the examples.
Figure 4:
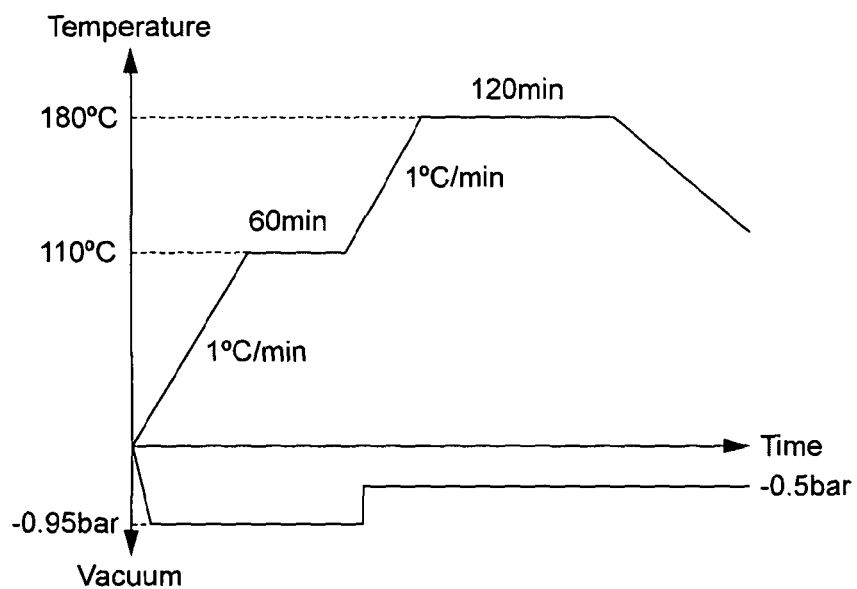
FIG. 4 is a chart showing the cure cycle used in the examples.

Unidirectional laminates according to example 1 were made of dimensions 400×400 5 mm using 32 plies of prepreg in a quasi-isotropic lay-up. The prepreg stack was debulked under vacuum every four plies. The laminates were then cured in an oven according to a conventional cure cycle (as shown in FIG. 4) and vacuum bagging arrangement (as shown in FIG. 3).

Fabric laminates were made in the same way except that 12 plies were used to give a thickness of approximately 4.3 mm.

Example 3

C-Scan and Porosity Measurements

The cured laminates were C-scanned with Olympus Omniscan equipment to assess the quality of the laminates. In this test an ultrasonic probe is used to determine the presence of voids which show as white dots on a 2-D image of the laminate. From these C-scan data representative samples of laminate were cut, polished and observed under a microscope. Image analysis of micrographs was used to calculate an area percentage of voids.

Figure 1:
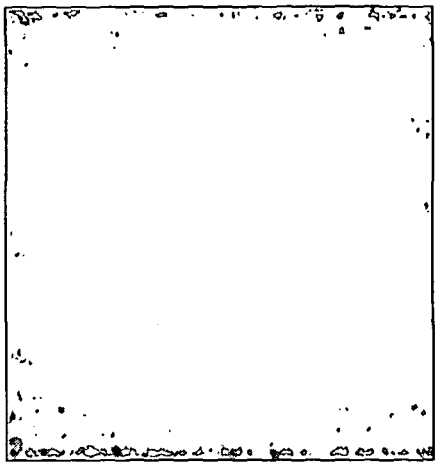
FIG. 1 shows an image of a cross-section through the cured laminate according to comparative Example 1 together with its C-scan.
Figure 1:
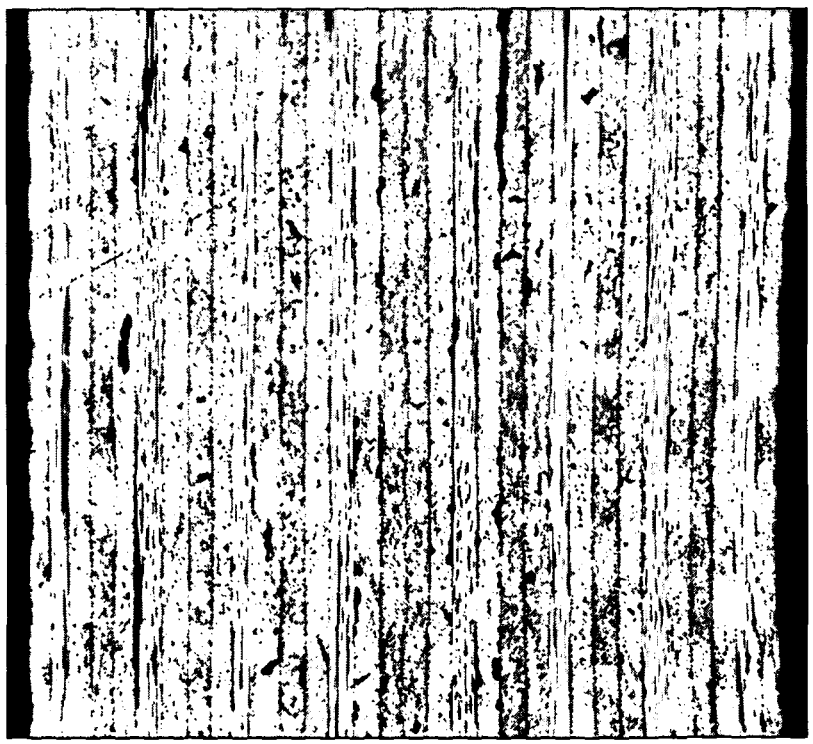

FIG. 1 shows the image obtained for Comparative Example 1, showing a porosity of 3.24 vol %.

Figure 2:
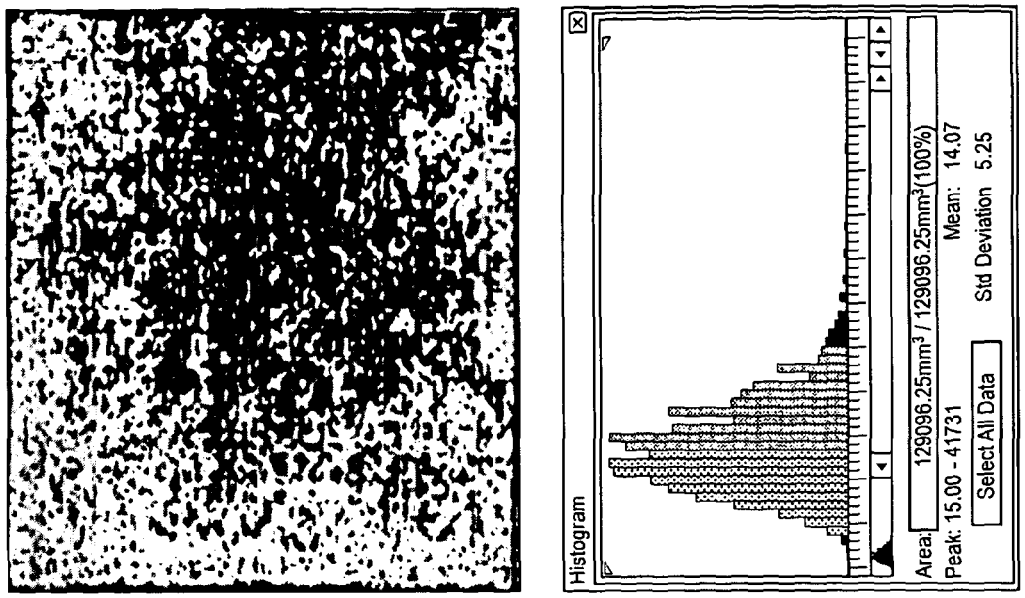
FIG. 2 shows an image of a cross-section through the cured laminate according to Example 1 together with its C-scan.
Figure 2:
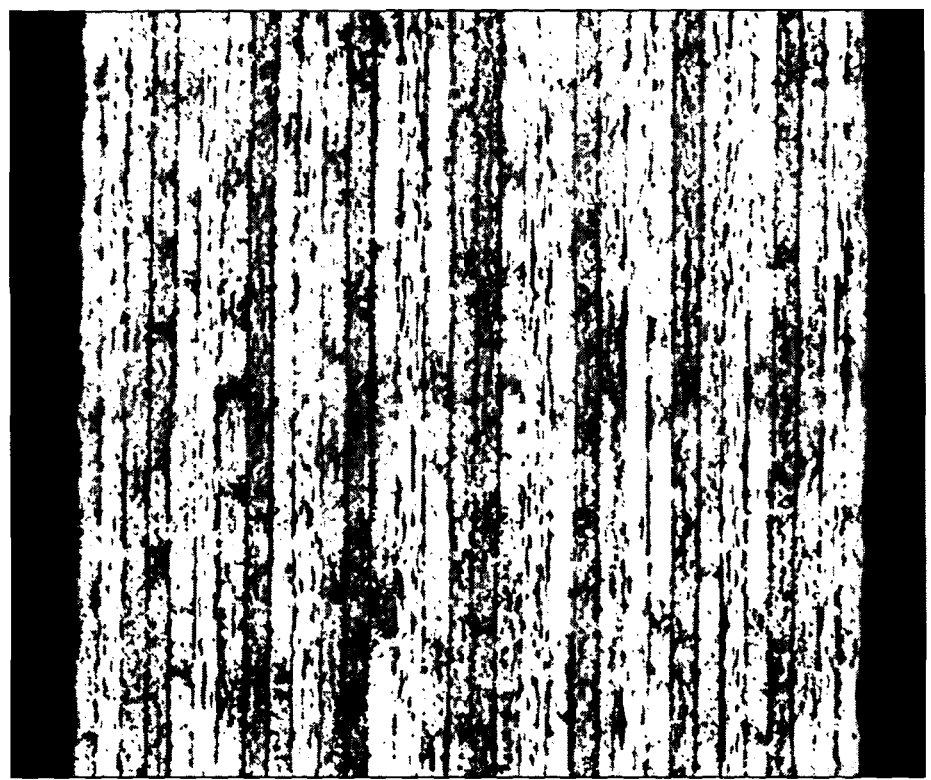

FIG. 2 shows the image obtained for Example 1 according to the invention, showing a porosity of 0.17 vol %.

Alternative embodiments of the invention will now be briefly introduced.

In one embodiment there is provided a process for the manufacture of a cured composite material, the process comprising the steps of blending together a liquid curable resin and a curing agent having a melting point greater than 100° C. to form a liquid blend of curable resin and curing agent, at least partially impregnating a structural fibre arrangement with the blended curable resin and curing agent to form a curable composite material, followed by curing the composite material by exposure to elevated temperature and at a pressure of no greater than 3 bar absolute to form a cured composite material.

In another embodiment the curing agent has a melting point greater than 120° C., preferably the melting point is greater than 140° C.

In a further embodiment, the curing agent comprises a diaminodiphenyl sulphone.

In an embodiment the blending is carried out at a temperature of from 60 to 180° C., preferably from 80 to 160° C., more preferably from 90 to 150° C.

In a further embodiment, the blended curing agent and curable resin, prior to fibre impregnation, is greater than 100° C., preferably greater than 120° C., more preferably greater than 140° C., for less than 10 minutes, preferably less than 2 minutes, more preferably less than 1 minute.

In an embodiment, a vacuum is applied during resin blending.

In a further embodiment, the process comprises passing the liquid curing agent and curable resin blend through a conduit having a characteristic diameter of less than 20 cm, preferably less than 10 cm. The walls of the conduit may be heated to a temperature of from 100 to 300° C. The conduit may comprise mixing elements.

In another embodiment, a screw extruder is employed to provide the conduit and the mixing elements.

In a further embodiment, structural fibres are planar, so that they form a prepreg once impregnated.

In another embodiment, the curable composite material is formed into an aerospace structural component.

In another embodiment, the curing process is carried out at a pressure of less than 2.0 bar absolute, preferably less than atmospheric pressure. Curing may be carried out by the so-called vacuum bag technique.

In a final embodiment, the cured composite material has a porosity of less than 3.0% by volume porosity, preferably less than 2.0%, more preferably less than 1.0%, most preferably less than 0.5%.

There is thus provided a process for preparing a resin and a curable composite which allows the composite when laid up to form a moulding, to be cured using conventional equipment without an autoclave whilst still having a reduced porosity in the cured moulding which would usually be associated with in-autoclave curing of curable composites.

The invention claimed is:

1. A process for preparing a reinforcement resin comprising the steps of:
   a) providing a liquid curable resin comprising an epoxy resin component and a thermoplastic toughener component;
   b) providing a curing agent for said epoxy resin that is in the form of solid particles having particle sizes ranging from 10 microns to 100 microns;
   c) continuous blending of said curing agent with said liquid curable resin to dissolve the solid particles of curing agent within said liquid curable resin to form a liquid blend, wherein said continuous blending comprises passing said curable resin and said curing agent through a blender that comprises a conduit comprising a heated wall that defines an entrance, a blending zone having a circular cross-section with a diameter of less than 5 cm and an exit, applying a vacuum to said blending zone wherein the residence time of said curable resin and said curing agent within said blending zone is from 1 second to 2 minutes and wherein said liquid blend that flows from said exit is at a temperature of from 100° C. to 140° C.; and
   d) cooling said liquid blend after said liquid blend flows from the exit of said blender to form the reinforcement resin.

2. The process of claim 1, wherein the residence time of said curing agent and liquid curable resin as they pass through said blender ranges from 30 seconds to 2 minutes.

3. The process of claim 1, wherein said cooling is conducted by increasing the surface area of said liquid blend that is exposed to a cooling medium.

4. The process of claim 1, wherein said liquid blend is cooled by casting of the liquid blend or by impregnation of a structural fibre component with said liquid blend.

5. The process according to claim 1, wherein said thermoplastic toughener comprises polyethersulphone.

6. The process of claim 1 which includes the additional step of partially impregnating a structural fibre arrangement with said reinforcement resin to form a curable composite material.

7. The process according to claim 1 wherein the curing agent has a melting point greater than 100° C.

8. A process for the manufacture of a cured composite material comprising a process according to claim 6 followed by curing the curable composite material by exposure to a temperature of at least 60° C. and at a pressure greater than one bar without use of an autoclave to form a cured composite material.

9. The process according to claim 1, wherein the wall of said conduit is heated at a temperature of 110° C.

10. The process according to claim 6, wherein the temperature of the blended curing agent and curable resin prior to fibre impregnation, is greater than 100° C. for less than one minute.

11. The process according to claim 6, wherein the structural fibres are planar, so that they form a prepreg once impregnated.

12. The process according to claim 6, wherein the curable composite material is formed into an aerospace structural component.

13. The process according to claim 6, wherein the curing process is carried out at a pressure of less than 2.0 bar absolute.

14. The process according to claim 1, wherein said curing agent is selected from the group consisting of 3,3' diaminodiphenyl sulphone and 4,4' diaminodiphenyl sulphone.

15. The process according to claim 14, wherein said curing agent comprises both 3,3' dianunodiphenyl sulphone and 4,4' diaminodiphenyl sulphone.

16. The process according to claim 1 wherein a twin screw extruder is located in said blending zone.

17. The process according to claim 1 wherein said blending zone has a circular cross-section with a diameter of 2.5 cm.

18. The process according to claim 16 wherein said blending zone has a circular cross-section with a diameter of 2.5 cm.

19. The process according to clam 17 wherein the heated wall of said conduit is at a temperature of 110° C.

20. The process according to claim 18 wherein the heated wall of said conduit is at a temperature of 110° C.

* * * * *